United States Patent [19]
Hansen et al.

[11] Patent Number: 6,085,282
[45] Date of Patent: *Jul. 4, 2000

[54] METHOD AND APPARATUS FOR DISTINGUISHING REGISTER READS FROM MEMORY READS IN A FLASH MEMORY

[75] Inventors: John Phillip Hansen; Erik Metzger, both of Austin, Tex.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,371

[22] Filed: Sep. 24, 1997

[51] Int. Cl.$^7$ ........................................... G06F 12/02
[52] U.S. Cl. ................................ 711/103; 711/156
[58] Field of Search ..................... 711/103, 156, 711/170; 365/185.33, 189.01, 189.03, 189.04, 189.05, 189.07

[56] References Cited

U.S. PATENT DOCUMENTS

| | | | |
|---|---|---|---|
| 5,034,922 | 7/1991 | Burgess | 365/189.07 |
| 5,339,279 | 8/1994 | Toms et al. | 365/185 |
| 5,369,754 | 11/1994 | Fandrich et al. | 711/103 |
| 5,463,757 | 10/1995 | Fandrich et al. | 711/103 |
| 5,541,886 | 7/1996 | Hasbun | 365/185.03 |
| 5,590,306 | 12/1996 | Watanabe et al. | 711/115 |
| 5,844,843 | 12/1998 | Matsubara et al. | 365/185.24 |
| 5,867,417 | 2/1999 | Wallace et al. | 365/52 |

OTHER PUBLICATIONS

Advanced Micro Devices, Inc. Aug. 1997, "Simultaneous Read/Write Architecture", 3 pgs.
Advanced Micro Devices, Inc. May 1997, Am29DL800T/Am29DL800B Megabit (1 M×8–Bit/512 K×16–Bit) CMOS 3.0 Volt–only, Simultaneous Operation Flash Memory, pp. 1–38.

*Primary Examiner*—Do Hyun Yoo
*Assistant Examiner*—Gary J. Portka
*Attorney, Agent, or Firm*—Daniel D. Hill

[57] ABSTRACT

A non-volatile memory (12) such as FLASH provides for two modes of operation: command mode and memory mode. Read requests in command mode read non-volatile memory status information, such as from status registers (29). Reads in memory mode return data stored in a non-volatile memory array (20, 22). A command mode read is distinguished from a memory mode read by whether a command mode indication is received within the same memory cycle as a read indication. The command read indication may be an operand address within a prespecified range of memory addresses or through a dedicated input pin. The prespecified memory addresses may be memory-mapped to status registers (29), allowing reads of status registers (29) when an operand address is within the prespecified range without the necessity of entering and leaving command mode, and otherwise to data (20, 22) stored in the non-volatile memory (12).

12 Claims, 5 Drawing Sheets

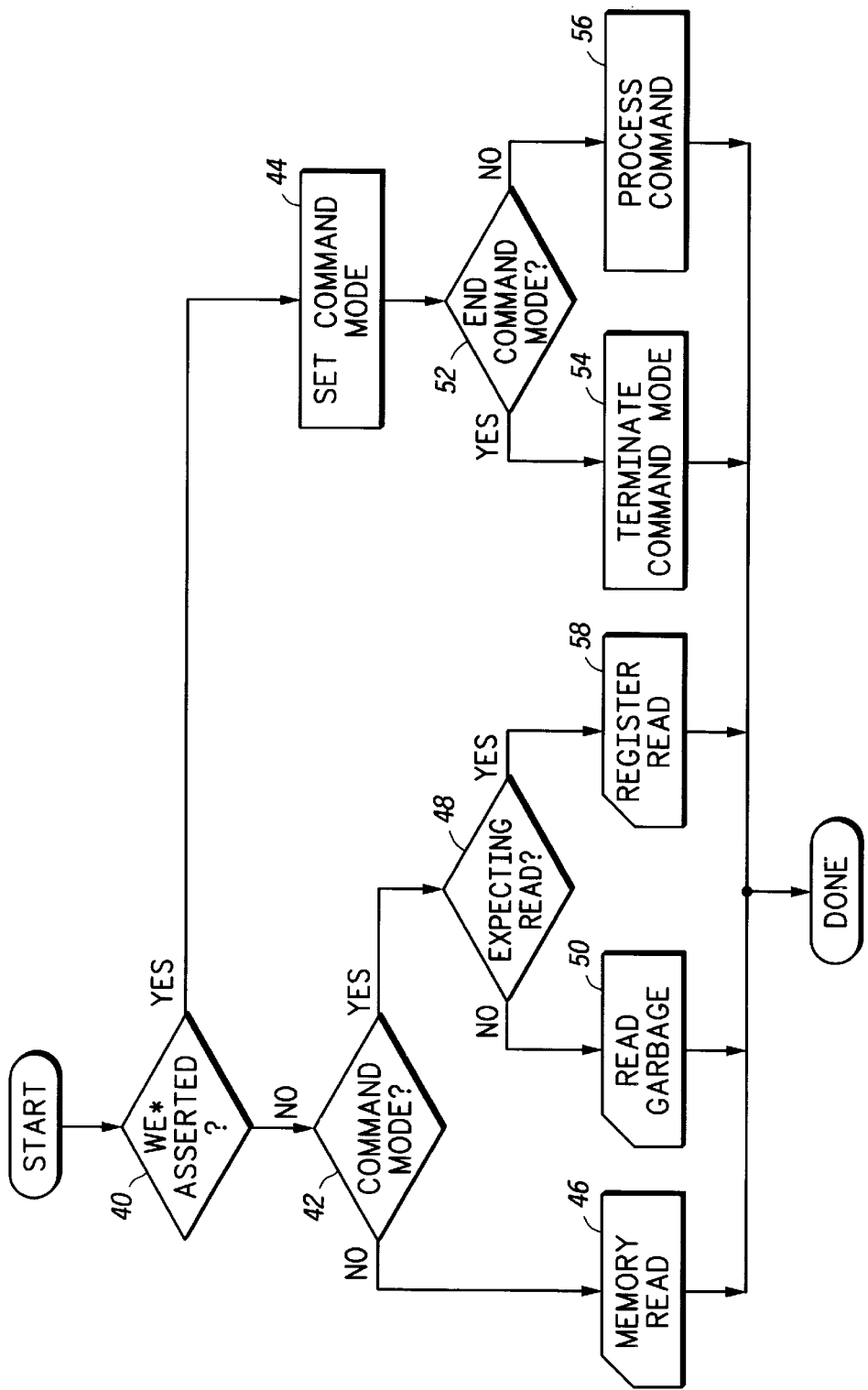
FIG. 7 —PRIOR ART—

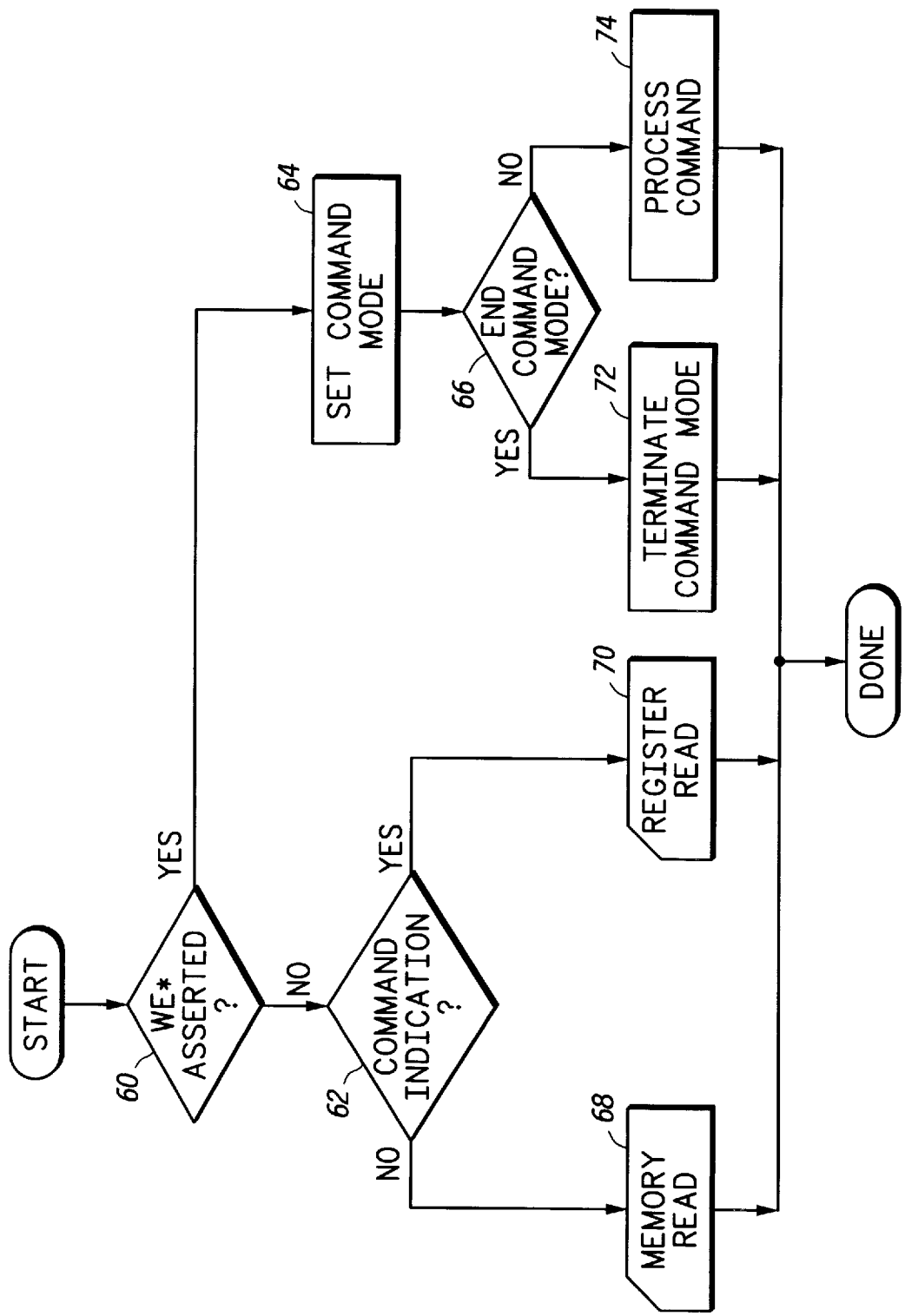

METHOD AND APPARATUS FOR DISTINGUISHING REGISTER READS FROM MEMORY READS IN A FLASH MEMORY

FIELD OF THE INVENTION

The present invention relates in general to flash memory and, more particularly, to a method and apparatus for distinguishing register reads from memory reads in a flash memory.

BACKGROUND OF THE INVENTION

A flash memory is a type of non-volatile memory that uses floating gate transistors. The floating gate transistors can be programmed, erased, or read. Generally, a flash memory has two modes of operation, a command mode and a memory mode. The memory mode allows for reading the floating gate transistor memory cells and the command mode is for programming or erasing the memory cells. Also, in the command mode, control or status registers may be read, suspend or resume program/erase operations, and terminate command mode.

A problem with flash memory is that a program or erase operation requires significantly more time to complete than a read operation. Because of this, some flash memories allow for a read operation to occur at the same time as a command mode operation. Examples of commands that are read from the control registers include manufacturer identification, device identification, sector protect verify, program, etc.

A need then exists to distinguish from a command mode read and a memory mode read. For example, in the case of an interrupt, a typical sequence for a processor is to fetch the interrupt vector from a memory location. The interrupt vector tells the processor where to get the first instruction of the interrupt service routine and then the processor fetches the first instruction of the interrupt service routine. The interrupt may be accomplished by a hardware signal to the processor indicating that an interrupt needs to occur, an d can occur at any time. If the interrupt occurs while the flash is in command mode, the read of the first instruction of the interrupt service routine may occur between a command to read a control or status register and the read of the control or status register. This would cause the first instruction retrieved to use the value of the control or status register instead of the instruction. This would result in unpredictable system behavior.

Therefore, there exists a need for distinguishing between a command mode read and a memory mode read in a flash memory system.

BRIEF DESCRIPTION OF THE DRAWINGS

FIG. 7 is a flowchart that illustrates a prior art method for entering command mode.

FIG. 8 is a flowchart that illustrates distinguishing a control register read from a memory array read in accordance with the present invention.

DESCRIPTION OF A PREFERRED EMBODIMENT

Figure 1:
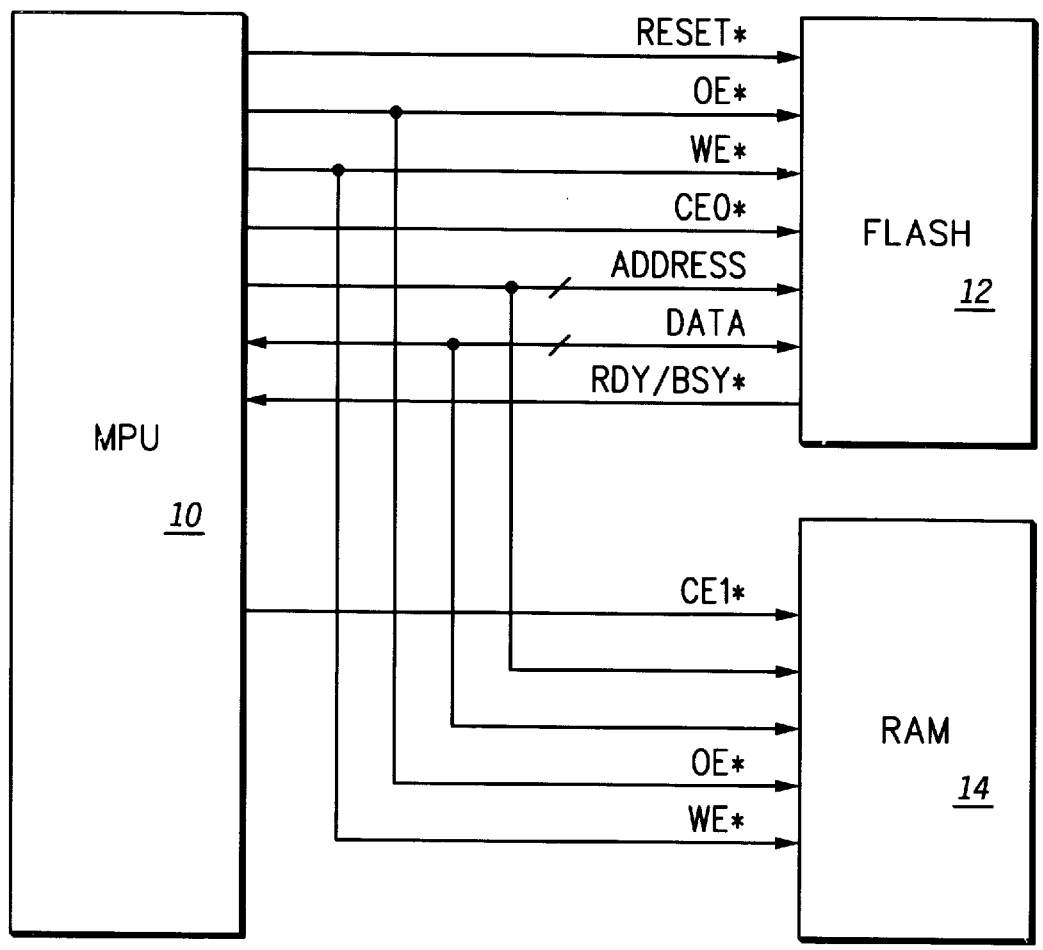
FIG. 1 illustrates, in block diagram form, a data processing system in accordance with the present invention.

FIG. 1 illustrates, in block diagram form, a data processing system in accordance with the present invention. The data processing system includes a microprocessor unit (MPU) 10, flash memory unit 12, and random access memory (RAM) 14. MPU 10 is coupled to both flash memory unit 12 and RAM 14 via a common address and data bus. In addition, there are various control signals provided to control the memory units. These include an output enable, write enable, reset, and chip enable.

Conventionally, RAM 14 may be used to temporarily store instructions for use by MPU 10. Before being executed, the instructions first must be loaded into RAM 14 from flash memory unit 12. Generally, this is done because RAM 14 does not have a command mode and therefore the problem of attempting a read operation of the memory array during command mode doesn't exist. However, using a large RAM 14 to store the instructions increases the cost and complexity of the data processing system.

Generally, the present invention provides a flash memory unit which distinguishes, based on an indicator, between a memory mode read and a command mode read. Such that, if for example, an interrupt occurs while flash memory unit 12 is in command mode, flash memory unit 12 will detect that MPU 10 expects to read from the memory array and provides a control signal to change flash memory unit 12 to memory read mode. Note that a memory mode read is generally a read operation from an addressable location in the flash memory array, and a command mode read is a read operation from any other location other than the memory array, such as from one of the registers for storing control or status information.

The present invention allows for instructions to be executed by MPU 10 to be read directly from flash memory unit 12, thereby eliminating the need for at least a portion of RAM 14, lowers interrupt latency, and provides higher system bandwidth.

To enter command mode from memory read mode, a write enable signal labeled "WE*" is asserted. Note that an asterisk (*) after a signal name indicates that the signal is a logical complement of a signal having the same name, but lacking the asterisk. Flash memory unit 12 remains in command mode after write enable WE* is negated and until a command to terminate command mode and re-enter memory read mode is received. Also, command mode may be terminated after a predetermined number of write cycles have occurred, or a reset signal, labeled "RESET*" is asserted.

Figure 2:
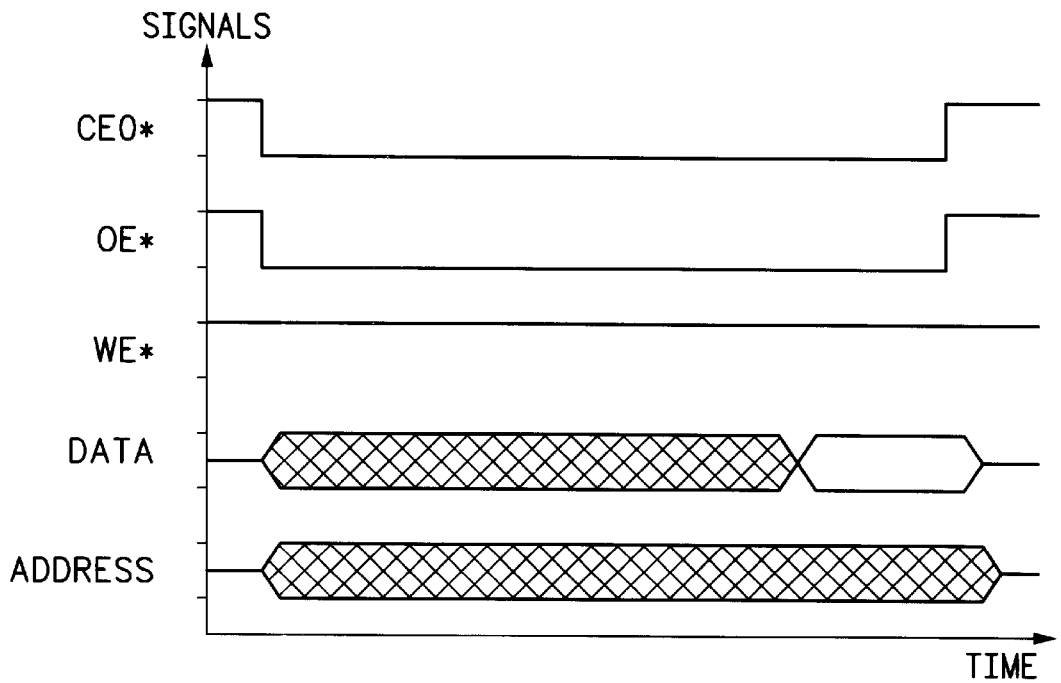
FIG. 2 illustrates, in timing diagram form, various signals for reading a control or status register during a command mode of the flash memory of FIG. 1.
Figure 3:
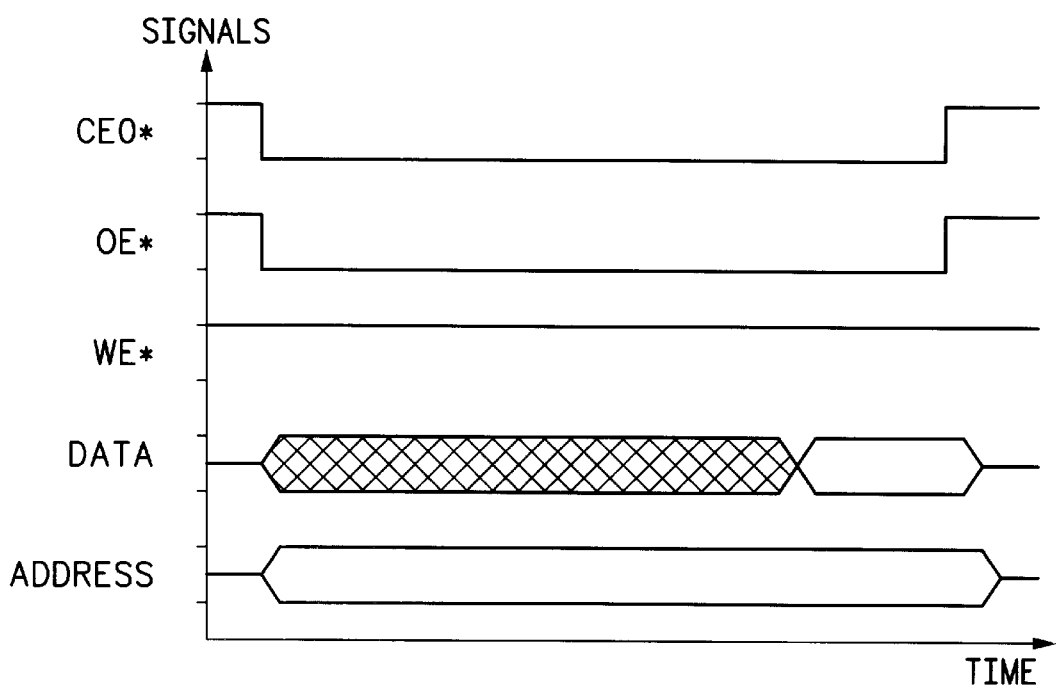
FIG. 3 illustrates, in timing diagram form, a read from the flash memory of FIG. 1 during memory mode.

FIGS. 2 and 3 illustrate timing diagrams for distinguishing command mode from a memory mode read. FIG. 2 illustrates, in timing diagram form, various signals associated with a command mode of flash memory 12. In FIG. 2, a chip enable signal labeled "CE0*" is asserted, an output enable signal OE* is asserted while the write enable signal WE* remains high. After CE0* and OE* are asserted, data is invalid for a certain amount of time until non-memory array, or control or status information, is provided by flash memory unit 12 to MPU 10 on a data bus labeled "DATA". As illustrated in FIG. 2, the address may be "DON'T CARE".

FIG. 3 illustrates, in timing diagram form, a read operation from flash memory 12 during memory read mode. During memory read mode, CEO* and OE* are asserted, WE* remains high. After CE* and OE* are asserted, the data is invalid for a certain amount of time until memory array data is provided by flash memory unit 12 to MPU 10. The location to be read is determined by the address.

Figure 4:
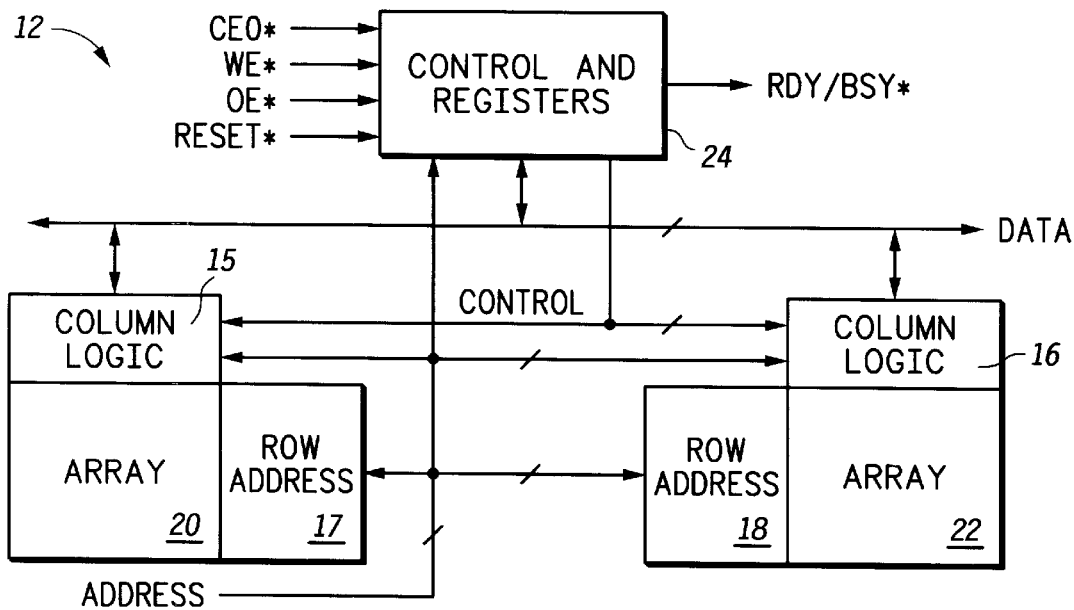
FIG. 4 illustrates, in block diagram form, the flash memory unit of FIG. 1 in greater detail.

FIG. 4 illustrates, in block diagram form, flash memory unit 12 in greater detail. Flash memory unit 12 includes memory arrays 20 and 22 and control and registers 24. Coupled to memory array 20 is column logic 15 and row address decoder 17. Coupled to memory array 22 is column logic 16 and row address 18. Control and registers 24 receives chip enable CEO*, write enable WE*, output enable OE*, and RESET*. Control and registers 24 provides a ready/busy signal labeled RDY/BSY*.

An address labeled "ADDRESS" is received from MPU 10 and provided to memory arrays 20 and 22 and to control and registers 24. As regarding the memory arrays, the row address portion of the address is provided to row address decoders 17 and 18 and the column address portion of the address is provided to column logic 15 and 16. A bidirectional data bus receives read data, or provides write data, to the memory arrays and to control and registers 24.

In flash memory unit 12, a read from one of arrays 20 or 22 can occur at the same time that the other array is being programmed or erased. This is known as a read while write (RWW). This is an advantage because interrupt vector tables, code for performing the flash programming, interrupt service routines and other system code can exist in the flash memory at the same time that the flash memory is being updated. Prior to allowing RWW, a flash memory was expected to be either read from, or written to. Prior to RWW, any instruction code or data that would be required while writing to the flash would be copied into system RAM and executed therefrom.

Figure 5:
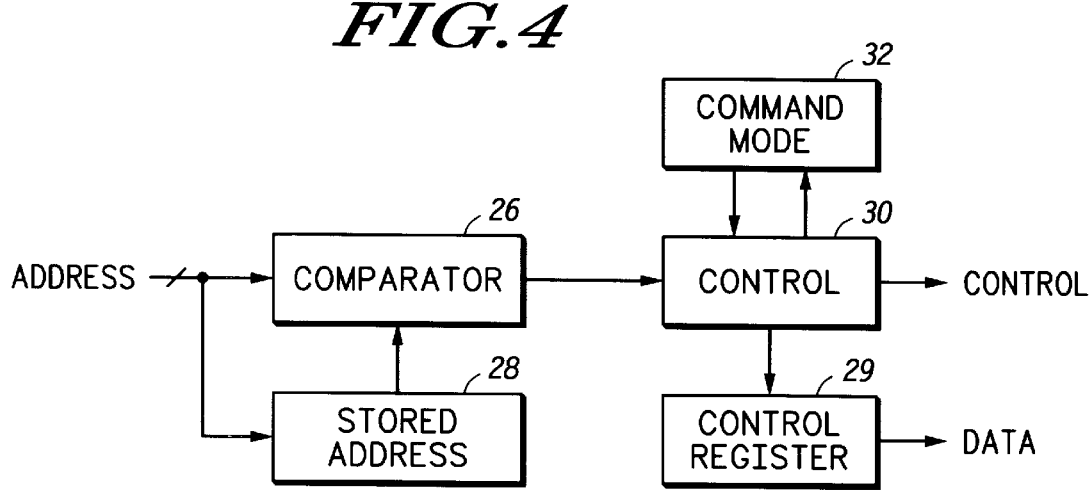
FIG. 5 illustrates, in block diagram form, a portion of the control and registers block of FIG. 1.

FIG. 5 illustrates, in block diagram form, a portion of control and registers 24 in accordance with one embodiment of the present invention. FIG. 5 includes a comparator 26, a storage element 28 for storing an address associated with the control or status register, control 30, command mode storage element 32, and control register 29. An address is stored in storage element 28 via a command mode operation.

During operation, comparator 26 and storage element 28 both receive ADDRESS, and in the event of a match between the stored address in storage element 28 and the currently received address, and the command mode bits stored in block 32 is set indicating that the address stored in storage element 28 is valid, then control 30 provides control signals labeled "CONTROL" to column logic 15 and/or column logic 16 to enter command mode. Data is prevented from being read from either of arrays 20 or 22. Also, in the event of a match between the stored address in storage element 28 and the currently received address, and the command mode bits stored in block 32 is cleared, indicating that the address stored in storage element 28 is invalid, then data is read from one of memory arrays 20 or 22. Note that the illustrated embodiment, only two memory arrays are shown. In other embodiments, more than two memory arrays may be included. In the event that the address received by comparator 26 is not the same as the address stored in storage element 28 then a control signal is sent to arrays 20 and 22 indicating that the data pointed to by the address is to be read from memory arrays 20 and 22.

Figure 6:
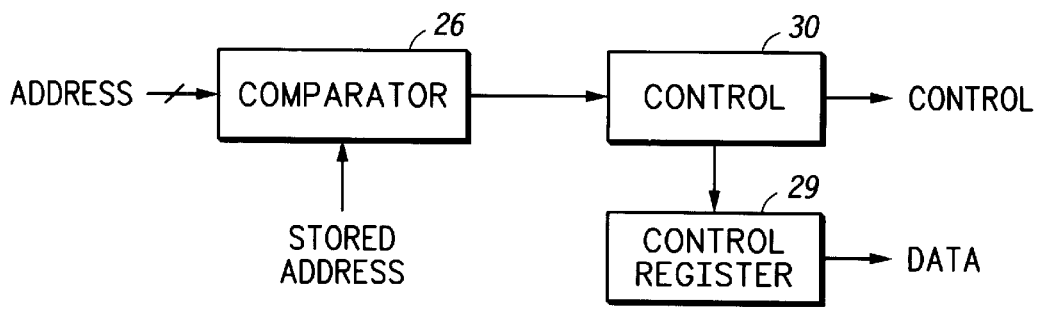
FIG. 6 illustrates, in block diagram form, a portion of the control registers block of FIG. 4.

FIG. 6 illustrates, in block diagram form, a portion of control and registers 24 in accordance with another embodiment of the present invention. A stored address labeled "STORED ADDRESS" is predetermined and permanently programmed as one input to comparator 26 and addresses are provided to a second input of comparator 26. In the event of a match between the STORED ADDRESS and ADDRESS, a control signal is asserted and provided to control 30 placing flash memory unit 12 in the command mode. The memory arrays 20 and 22 are inhibited and data is read from control register 29. If the addresses STORED ADDRESS and ADDRESS do not match, then data is read from the address from either of arrays 20 or 22.

Note that in a third embodiment (not shown), comparator 26 may be replaced with an external terminal, or pin, used to place flash memory unit 12 in command mode or the control signal may be generated by MPU 10 based on predetermined criteria.

FIG. 7 is a flowchart that illustrates a prior art method for entering command mode. This method is executed by the flash memory unit 12 every time the chip enable (CE*) signal is detected to have been asserted. A test is made whether the write enable WE* signal is being asserted, step 40. If write enable WE* was is being asserted, step 40, command mode is entered, step 44. A test is then made whether a command received by the flash memory unit 12 over the data lines is equal to the end command mode command (FFh), step, 52. If the command is the end command mode command (FFh), step, 52, command mode is terminated, step 54. Otherwise, when the command is not the end command mode command (FFh), step 52, the command received over the data lines is processed, step 56. In either case, regardless of which command was read and processed, the method is now done until the next Chip Enable (CE*) signal is received.

If the Write Enable (WE*) signal is being not asserted, step 40, a test is made whether flash memory unit 12 is in command mode, step 42. Note that command mode is entered in step 44, and terminated in step 54 of the write path. It can also be terminated by receipt of the RESET* signal. If the flash memory unit 12 is not in command mode, step 42, the flash memory unit 12 is in memory read mode, and the address specified on the address lines is used to index into the memory array 20, 22, and the resulting value addressed by the address lines is transmitted to the processor 10 on the data lines, step 46. Otherwise, if the flash memory unit 12 is in command mode, step 42, at test is made to determine whether the flash memory unit 12 is expecting a read request, step 48. For example, the flash memory unit 12 would expect a read request when the previous command executed in step 56 on a previous memory cycle was a read status register command. If the flash memory unit 12 is not expecting the read request, step 48, undefined data is transmitted on the data lines to the processor 10, step 50. Otherwise, when the read is expected, step 48, contents of the corresponding register 29 are transmitted over the data lines to the processor 10, step 58. In all cases, the memory method is now complete until the next detection of assertion of the Chip Enable (CE*) signal by the flash memory unit 12.

One problem with the method described in FIG. 7 is that reads from the memory array 20, 22 cannot occur while the flash memory unit 12 is in command mode. Command mode must first be terminated before a read can take place from either memory array 20 or memory array 22. This is especially troublesome when the processor 10 cannot easily determine or remember whether it is in memory mode or command mode, such as when the processor 10 receives an interrupt.

FIG. 8 is a flowchart that illustrates distinguishing a control register 29 read from a memory array 20, 22 read in accordance with the present invention. This method is executed by the memory controller 24 every time chip enable (CE0*) is detected to be asserted. A test is made whether write enable WE* is asserted, step 60. If the write enable WE* signal is being asserted, step 60, command mode is entered, step 64. A test is then made whether the command received over the data lines is equal to the End Command Mode command (FFh), step, 66. If the command is the End Command Mode command (FFh), step, 66, command mode is terminated, step 72. Otherwise, when the command is not the End Command Mode command (FFh), step 66, the command received from the processor 10 over the data lines is processed, step 74. In either case, regardless of which command was received, the method is now done until the next Chip Enable (CE0*) signal is received.

If the Write Enable (WE*) signal is not being asserted, step 60, a test is made for having received a Command Read Indication within the current memory cycle, step 62. This Command Read Indication may be an address within a specified address range, or may be a separate pin on the memory. If a Command Read Indication has not been received in the current memory cycle, step 62, a memory mode read is indicated, and the address specified on the address lines is used to index into the memory array 20, 22, and the resulting value addressed by the address lines is transmitted to the processor 10 on the data lines, step 68. Otherwise, if a Command Read Indication has been received in the current memory cycle, step 62, contents of a specified register 29 are transmitted over the data lines to the processor 10, step 70. In all cases, the memory method is now complete until the next detection of assertion of the Chip Enable (CE0*) signal by the memory.

Note that the flowcharts in FIGS. 7 and 8 appear to be serially executed a single time whenever the chip enable (CE0*) signal is detected to have been asserted, i.e. once per memory cycle. However, this is a simplification, and the actual operation of the flash memory unit 12 in both FIGS. differs somewhat when implemented in digital logic. Instead of being executed once per memory cycle, the method can be better viewed as being reexecuted every time a relevant signal changes during any given memory cycle.

By providing an ability to determine when flash memory unit is in command mode, a portion of RAM 14 is eliminated that would be used to store instructions such as for servicing an interrupt. If an interrupt occurs while attempting a read to the status register or one of the control registers, it can be determined that flash memory unit 12 is in command mode and that command mode must be terminated before the interrupt can be serviced.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true scope of the invention.

What is claimed is:

1. A data processing system comprising:

a processor and a non-volatile memory, and an interface coupling the processor and the non-volatile memory comprising:

a plurality of data lines for providing a plurality of data signals, and a first plurality of address lines for providing a plurality of address signals for specifying an operand address, wherein:

a write command received from the processor for the non-volatile memory puts the non-volatile memory into a command mode;

a read command received from the processor for the non-volatile memory received along with a command read indicator within a same memory cycle indicates a command mode read of a control or status register for the non-volatile memory, and the read command received from the processor for the non-volatile memory that is received without the command read indicator within the same memory cycle as the read command indicates a memory read of a plurality of bits from the non-volatile memory and transmission of the plurality of bits over the plurality of data lines to the processor, wherein the read command for a command mode read of the control or status register is distinguished from the read command for a memory read solely by the command read indicator, and the command read indicator is provided in addition to the read command.

2. The data processing system in claim 1 wherein:

the command read indicator is an input signal received by the non-volatile memory.

3. The data processing system in claim 2 wherein:

the input signal is derived from a one of a second plurality of address lines.

4. The data processing system in claim 1 wherein:

the interface further comprises:

a write enable line for providing a write enable signal, and a chip enable line for providing a chip enable signal, and a write request is indicated by assertion of the chip enable signal and assertion of the write enable signal.

5. The data processing system in claim 1 wherein:

the interface further comprises:

a write enable line for providing a write enable signal, and a chip enable line for providing a chip enable signal, wherein a read request is indicated by assertion of the chip enable signal and a negation of the write enable signal.

6. The data processing system in claim 1 wherein:

the non-volatile memory is flash memory.

7. A non-volatile memory comprising:

a memory array;

a control circuit for controlling read functions to and command functions for the memory array;

an interface comprising:

a first plurality of address terminals for receiving a plurality of address signals that specify an operand address, and a plurality of data terminals for receiving and transmitting a plurality of data signals; and wherein:

a write command received by the non-volatile memory puts the non-volatile memory into a command mode, a read command received within a same memory cycle as a command read indicator is received indicates a command mode read of a control or status register for the non-volatile memory, and the read command received without the command read indicator within the same memory cycle as the read command is received indicates a read of a plurality of data bits from the memory array and transmission of the plurality of data bits as the plurality of data signals wherein the read command for a command mode read of the control or status register is distinguished from the read command for a memory read solely by the command read indicator, and the command read indicator is provided in addition to the read command.

8. The non-volatile memory in claim 7 wherein:

the command read indicator is an input signal received by the non-volatile memory.

9. The non-volatile memory in claim 8 wherein:

the input signal is derived from a one of a second plurality of address lines.

10. The non-volatile memory in claim 7 wherein:

the interface further comprises:

a write enable line for providing a write enable signal, and a chip enable line for providing a chip enable signal, and a write request is indicated by assertion of the chip enable signal and assertion of the write enable signal.

11. The non-volatile memory in claim 7 wherein:

the interface further comprises:

a write enable line for providing a write enable signal, and a chip enable line for providing a chip enable signal, and a read request is indicated by assertion of the chip enable signal and a negation of the write enable signal.

12. The non-volatile memory in claim 7 wherein:

the non-volatile memory is flash memory.

\* \* \* \* \*